V. ORMSTRUP.
THREADLESS NUT.
APPLICATION FILED AUG. 5, 1916.

1,256,250.

Patented Feb. 12, 1918.

WITNESSES

INVENTOR
Viggo Ormstrup
BY
ATTORNEY

UNITED STATES PATENT OFFICE.

VIGGO ORMSTRUP, OF GLENS FALLS, NEW YORK.

THREADLESS NUT.

1,256,250.　　　　Specification of Letters Patent.　　Patented Feb. 12, 1918.

Application filed August 5, 1916.　Serial No. 113,297.

*To all whom it may concern:*

Be it known that I, VIGGO ORMSTRUP, a citizen of the United States, residing at Glens Falls, in the county of Warren and State of New York, have invented certain new and useful Improvements in Threadless Nuts, of which the following is a specification.

This invention has relation to a threadless nut, and has for an object to provide a nut adapted to be engaged upon a bolt, and adjustable and movable instantly upon the bolt to any position on the threaded portion thereof, and embodying means for engaging the bolt to retain the nut stationary relative to the bolt subsequent to its adjustment thereon.

In addition to the foregoing, my invention comprehends improvements in the details of construction and arrangement of parts, to be hereinafter described and particularly set forth in the appended claim.

Figure 1:
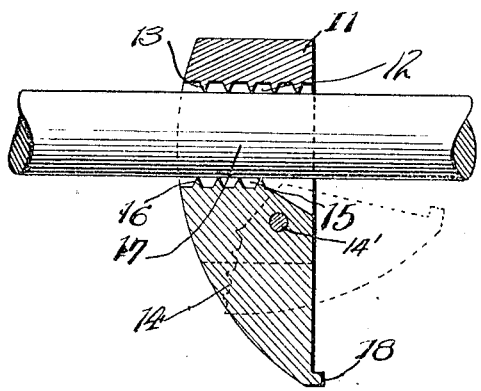

In the accompanying drawings, in which similar and corresponding parts are designated by the same characters of reference throughout the several views in which they appear:

Figure 1 is a view in section of my improved threadless nut applied to a rod.

Figure 2:
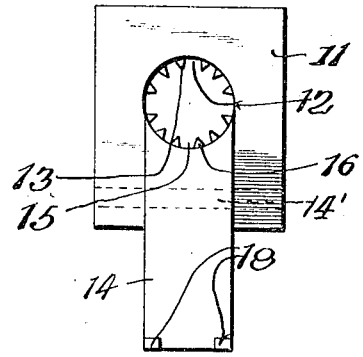

Fig. 2. is a face view of the nut.

My invention finds its greatest degree of employment in concrete form construction work, wherein bolts are used to hold the form together, and owing to repeated removal and replacement of the bolt, the threads thereof become mutilated and the application of a nut thereto is rendered difficult if not entirely impossible. I contemplate the provision of a nut, without threads, and whereby the nut may be adjusted instantly along the bolt to the desired point to clamp the work, and a pawl associated with the nut for engaging the threads of the bolt and to secure the nut thereto against displacement.

With reference to the drawings a nut is indicated at 11 of substantially U-shaped configuration having the interior surface of the central opening 12 provided with a series of sharpened spurs 13. The pawl 14 is pivoted upon a pin 14' mounted in the nut to extend across its terminals, the pawl being provided upon its inner face 15 with a series of sharpened spurs 16. It will be also noted that the face 15 of the pawl is concaved to form a continuation of the curved surface of the opening 12 of the nut. In this manner the bolt 17 which is smooth and is not provided with threads, is inserted in the opening 13 and pawl 14 engaged thereupon. Said bolt will be tightly engaged and the spurs caused to penetrate slightly in the metal of the bolt. The nut should be moved adjacent the work so as to cause the pawl 14 to engage the work whereby to drive and securely retain the spurs of the pawl in engagement with the bolt. The movable extremity of the pawl may be provided with spurs 18 to engage the work to be clamped and thereby securely hold the nut against rotation.

While I have illustrated and described my invention with some degree of particularity, I realize that in practice various alterations thereover may be made, and I therefore reserve the right and privilege of changing the form of the details of construction or otherwise altering the arrangement of the correlated parts without departing from the spirit of the invention and the scope of the appended claim.

Having thus fully described my invention what I claim as new and desire to secure by Letters Patent is:

A nut of substantially U-shaped formation adapted to embrace a bolt, and having spurs formed upon the bolt engaging surface thereof, a pawl pivotally mounted within the terminals of the nut for oscillation in a plane parallel to the axis of the bolt for engaging the bolt, the bolt engaging surface of the pawl being curved to conform to the surface of a bolt and having a plurality of spurs, said pawl having one edge disposed adjacent the work engaging face of the nut, for engaging with the work to move the pawl whereby to engage the spurs thereof with the bolt, and spurs formed on said edge of the pawl for engaging the work to prevent rotative movement of the nut relative to the work.

In testimony whereof I affix my signature in presence of two witnesses.

VIGGO ORMSTRUP.

Witnesses:
 J. A. MAGURIS ORMSTRUP,
 CHARLES T. WAKELEY.

Copies of this patent may be obtained for five cents each, by addressing the "Commissioner of Patents, Washington, D. C."